Aug. 2, 1966                J. J. SCHOFIELD                3,263,620
                    LIGHT WEIGHT BEARINGS FOR GEAR PUMPS
Filed Feb. 7, 1964                                    3 Sheets-Sheet 2
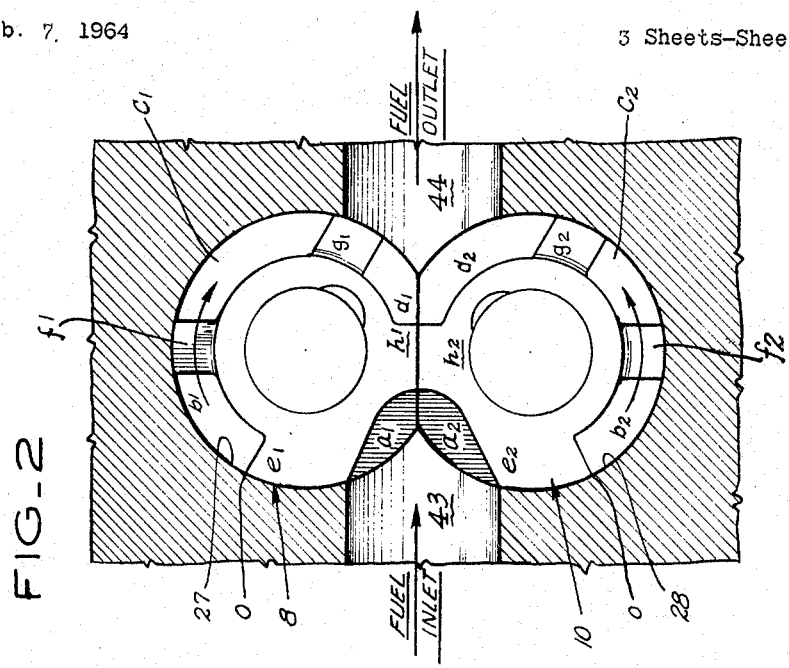
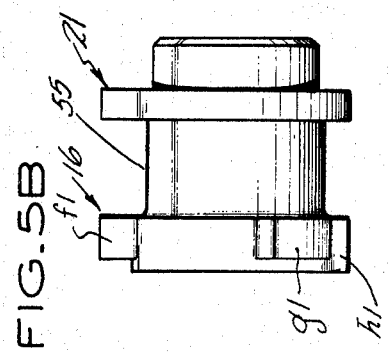
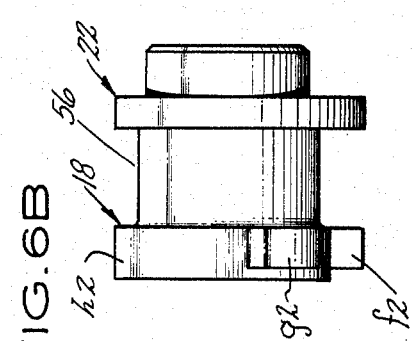
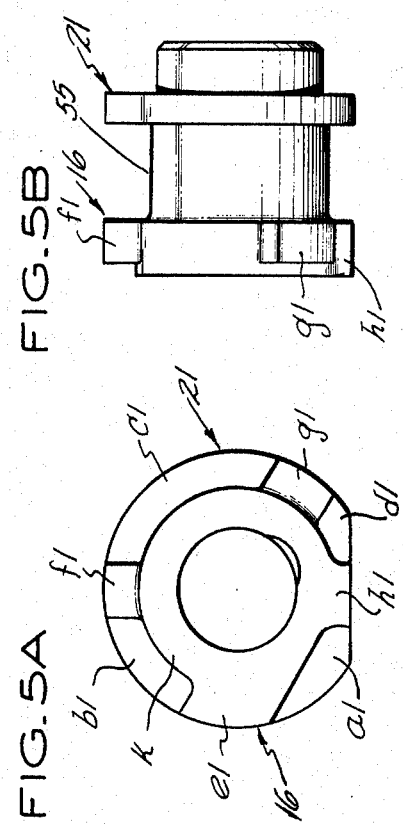
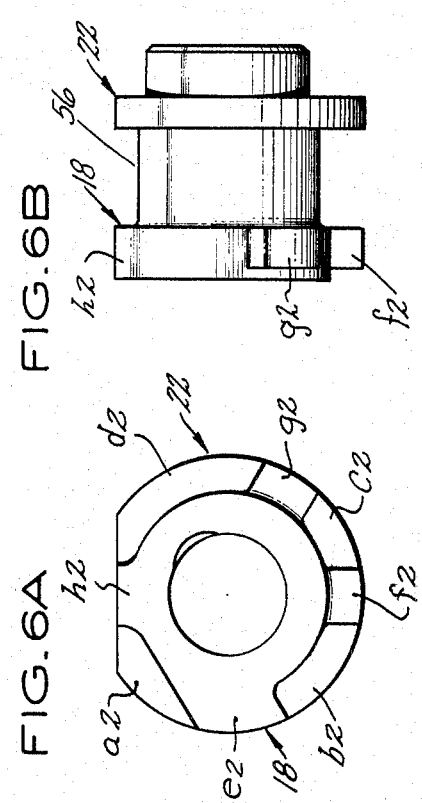
INVENTOR
JOHN J. SCHOFIELD
BY
ATTORNEY Aug. 2, 1966  J. J. SCHOFIELD  3,263,620
LIGHT WEIGHT BEARINGS FOR GEAR PUMPS
Filed Feb. 7, 1964  3 Sheets-Sheet 3
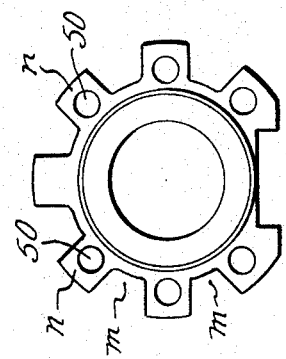
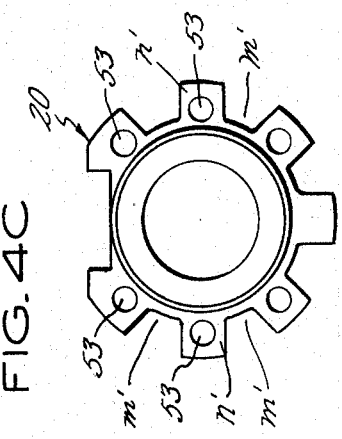
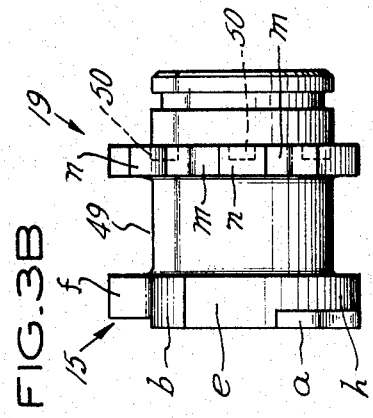
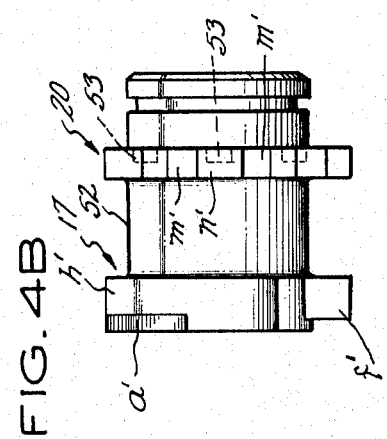
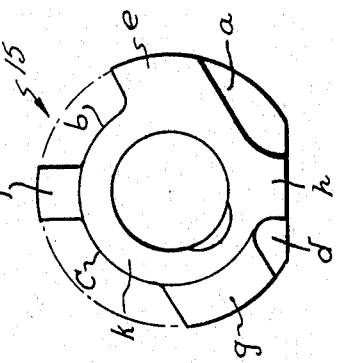
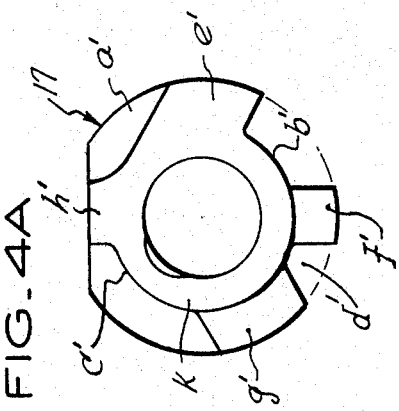
INVENTOR
JOHN J. SCHOFIELD
BY
ATTORNEY

3,263,620
LIGHT WEIGHT BEARINGS FOR GEAR PUMPS
John J. Schofield, Glastonbury, Conn., assignor to Chandler Evans Inc., West Hartford, Conn., a corporation of Delaware
Filed Feb. 7, 1964, Ser. No. 343,242
6 Claims. (Cl. 103—126)

This invention pertains to gear fuel pumps for aircraft engines, having fluid pressure-loaded bearings in which the rotating gear elements are journaled; and more particularly has reference to novel means for reducing the weight of the pump, and the friction between abutting moving elements so that less power is required to operate the pump, and there is less erosion and wear of the moving parts. My improvements thus increase the useful life and efficiency of the pump.

An objective of long standing in the art is to reduce the weight and material of gear fuel pumps, and at the same time to improve their performance; and this is particularly true for gear pumps which have pressure-loaded bearings to reduce flow losses, due to leakage past the gear or positive displacing elements that generate the flow and pressure of such pumps.

These bearings which comprise a flange and sleeve, are by nature of large size in proportion to the pump, in order to sustain the loads imposed by the pumping elements, and usually made of materials (metals) of high specific gravity. The flange portion of the bearing is of full diameter, except in one area where it is fabricated to form a bearing flat.

The flange surfaces of the bearings adjacent to the pump gears comprise three functional areas: 1 the inlet pressure area; 2 the high pressure, discharge area and 3 the pumping element mesh or contact area, which is followed again by the inlet pressure area. The extent of such areas in the flange surface is dependent upon the design of the pump. The inlet pressure area is effectively sealed from the high pressure discharge area by the pump element mesh area on the one hand, and on the other, by a tooth or teeth of the pumping elements and the housing.

In order to balance the bearing vector forces, a chamfer on the bearing flange communicates the pump discharge pressure to all of the gear interstices, except those near the pump inlet where sealing is necessary. Since all of the tooth interstices in the tooth mesh area are at discharge pressure, no sealing is required between such connected teeth. The only sealing requirement in this area is that which prevents leakage of discharge pressure into the journal clearance space.

Heretofore, little could be done to reduce the weight of fuel gear pump bearings. The flange could not be reduced in thickness or bending would result, and the sleeve portion of the bearing could not be reduced in diameter without unbalancing the pressure loading forces.

My invention of means to provide light weight bearings for gear pumps solves the problem of reducing pump weight, heat and debris generation, erosion and pulse generation, radial and axial bearing loads, horsepower; and also better controls the vector forces by means of my novel modification of the bearings heretofore used in gear pumps which have heavy pressure-loaded bearings.

In studying the problem of reducing bearing weight, I have discovered that a substantial portion of the flange area of the bearing is not necessary and can be removed without adversely affecting the performance and efficiency of the pump. I have also discovered that proper selective removal of portions of the flange actually results in better pump performance.

My invention involves the selective removal of portions of the flanges of the bearings, leaving a ring of the flange which mates against the face of the gears between the base of the teeth and the journals. Several legs extend from this ring to the walls of the pump housing to center the bearings. The regions of the bearing flanges which are subject to inlet pressures are retained, as well as a part of the flange area which composes the bearing flat. The total weight reduction of the bearings is of the order of one third, more or less.

The removal of the flange material reduces the generation of metal debris since the amount of surface subject to the rubbing and milling action of the pumping elements is reduced. The reduction of rubbing surfaces reduces the amount of heat generated; and reduction of rubbing flange surface decreases the wear of moving parts.

Because there is direct contact with the pressure-loading chamber, the pulses generated by the pumping elements travel into the pressure-loading chamber where they are attenuated. The attenuation of these pulses in turn lowers the forces acting on the gear teeth at the mesh region and thereby reduces the radial bearing loads.

Since there is no flange for these pulses to impinge upon, the axial force which urges the pressure-loaded bearing into intimate contact with the gear may be reduced, thus lower axial bearing forces are made possible by a reduction in the amount of pressure loading required. Further, the wear that is normally encountered on the bearing flats because of bearing vibration induced by pulse generation is eliminated.

Because of the reduction of rubbing surfaces and radial and axial bearing loads, the horsepower required to deliver any given flow and pressure is substantially reduced.

Additionally, since the discharge fluid is no longer confined to the interstices of the gear teeth, uniform pressure exists from the discharge port to the inlet seal area of the bearing flange. This enables the direction of the vector forces to be more accurately controlled than was possible heretofore with conventional bearings embodying an arcuate chamfer of their outer diameter.

My invention departs from prior art of gear pump pressure-loaded bearings, in that lighter bearings are provided, resulting in lighter gear pumps, with an accrual of advantages in performance. This is accomplished by selective partial removal of the flanges of the bearings adjacent to the pumping elements of a gear pump.

Means previously employed to provide journal bearings for the pumping elements consisted of a bearing with sleeves and flanges; the flanges having a constant outer diameter, except for the areas which contain the bearing flats. By removing all material from the flanges except for those portions which are at inlet pressure, the legs used to maintain the bearings in their position, and the portion of the flats whereby the bearings are kept separated; the lightening of the bearings is accomplished and better performance is obtained.

The objects and novel features of my invention are as follows:

(1) The bearings are substantially lightened by about one third of their former weight.
(2) The amount of heat generated by the rubbing action of the gear sides on the bearings is substantially reduced.
(3) Reduction in the amount of generated debris, due to wear and milling action of the gear teeth.
(4) Reduction of the fluid pulses generated by the interrupted action of the gear teeth by providing a resonance chamber where such pulses are attenuated.
(5) Reduction of the erosion of the bearing bushings.
(6) Reduction of the power required to operate the pump.

(7) Reduction of bearing loads.

The fluid to be pumped enters into the pumping chamber of the pump through the inlet. The rotating gear teeth move the fluid in the direction of the rotation, which is along the walls of the pump housing. At some point, generally one or two teeth of arc from the edge of the inlet to the pump chamber, the bearing flange is entirely cut away, and the interstices between the meshing gear teeth, as well as the pressure-loading chamber which is formed by the bearing flanges, the gear teeth, and the walls of the pump are filled by the pumped fluid, at the discharge pressure of the pump. The fluid remains at this pressure until discharged from the pump.

The high pressure fluid is prevented from re-entering the inlet portion of the pump by the teeth of the pumping elements which bear against the wall of the housing, by the mesh region of the pumping elements in the diametrically opposed region, and by the remaining portions of the bearing flanges which fit tightly against the housing and the side faces of the gears.

The reduction of the flange area in turn reduces the heat generated; reduces the incidence of erosion, and also reduces the debris generated by wear and milling action of the pumping elements. By virtue of the fact that the pumped fluid is delivered to the high pressure area impulses are generated by the gear teeth. The flanges do not confine these pulse waves to the tooth spaces, and the wave fronts travel in many directions so that their pulse energy is dissipated by the shear of the liquid and the interference with reflected waves from the pressure-loading chamber.

Pumps incorporating my invention of light weight bearings have been built and tested with success. This invention effectively reduces the weights of the bearings, reduces heat generated, reduces the incidence of erosion of the bearings, and attenuates the pulsations generated by the gear teeth.

With these and other objects in view, which may be incident to my improvements, my invention comprises the combination and arrangement of elements as described hereinbelow and illustrated in the drawings, in which:

FIGURE 2 is a cross-sectional view taken on line 2—2 of FIGURE 1;

FIGURES 3A, 3B and 3C show side and end elevational views of the upper left-hand bearing of FIGURE 1.

Figure 1:
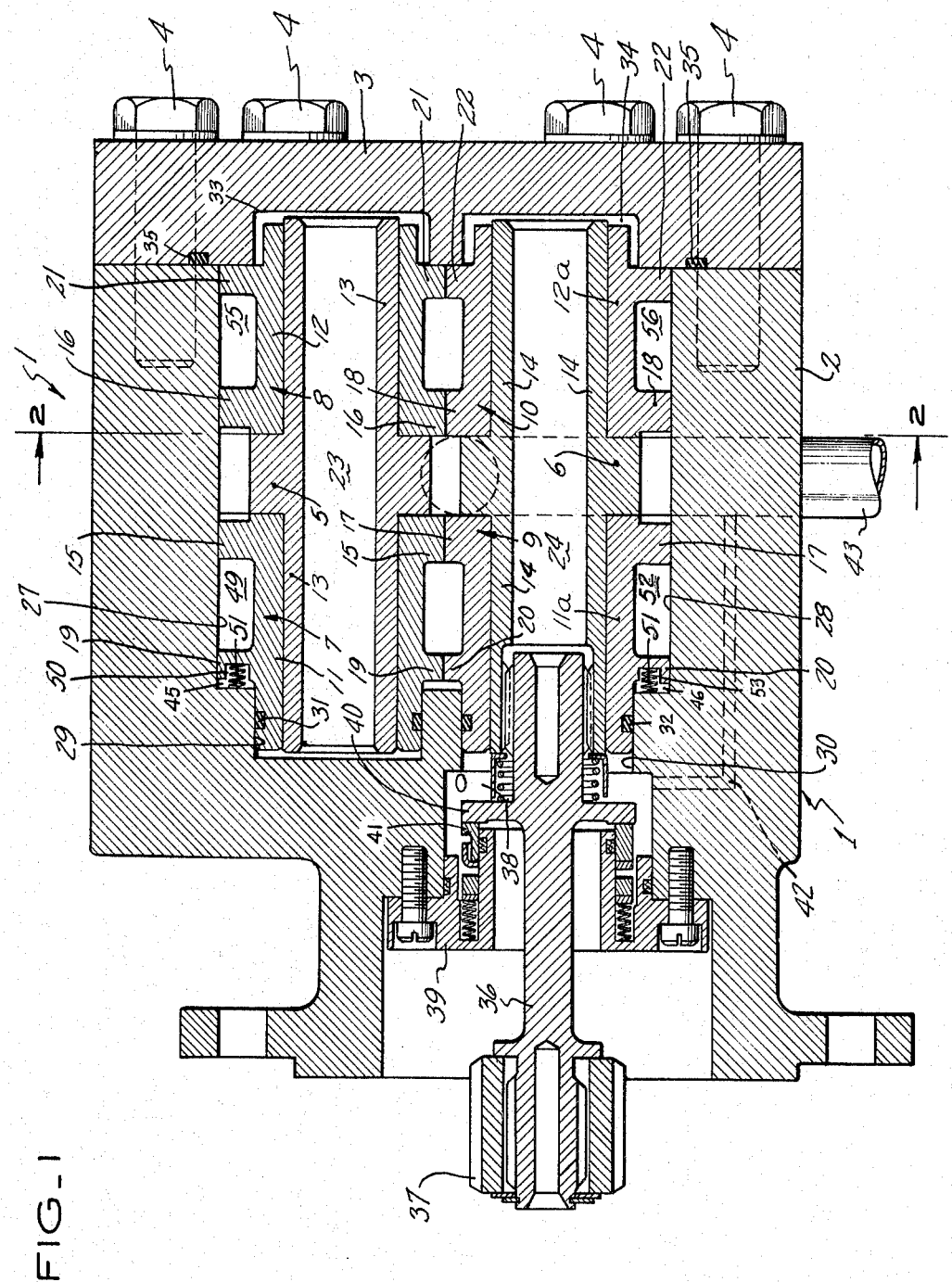
FIGURE 1 is a longitudinal section view of a pressure-loaded bearing, gear pump, embodying the principles of my invention.

FIGURES 4A, 4B, and 4C show front, side and end elevational views of the lower left-hand bearing of FIGURE 1.

FIGURES 5A and 5B show front and side elevation of the upper right-hand bearing of FIGURE 1; and FIGURES 6A and 6B show front and side elevation of the lower right-hand bearing of FIGURE 1.

Referring to FIGURE 1 of the drawings, the reference numeral 1 denotes generally a fuel gear pump, embodying my invention, which comprises a housing 2 and an end plate 3, secured together in fluid-tight relation by a plurality of bolts 4. Rotatably mounted in housing 2 are a pair of intermeshing gears 5 and 6, which are journaled in bearings 7, 8, and 9, 10, respectively, with a close running fit. Bearings 7 and 9 are pressure loaded. Each of bearings 7, 8, 9 and 10 comprises a pair of tubular sleeve portions 11, 12, and 11a, 12a respectively, integral with radially-extending flanges 15, 19; 16, 21; 17, 20; and 18, 22. All of these flanges are of generally circular configuration, except that where flanges 15 abuts 17; 16 abuts 18; 19 abuts 20; and 21 abuts 22; there are mating flat surfaces.

Housing 2 has a pair of cylindrical bores 27 and 28 into which the flanges 19, 15, 16, 21; and 20, 17, 18, 22; snugly fit, respectively. Housing 2 also has a pair of counterbores 29 and 30, concentric with and extending beyond bores 27 and 28 into which the inner end portions of sleeves 7 and 9 fit, respectively. Bores 29 and 30 are respectively sealed with O-rings 31 and 32, which prevent fluid leakage between sleeve 11 and counterbore 29 and between sleeve 11a and counterbore 30, respectively. End plate 3 also has a pair of circular recesses 33 and 34, into which the ends of tubular portion 12, of bearing 8, and tubular portion 12a, of bearing 10, extend, respectively. End plate 3 is also provided with an O-ring 35 which seals the joint between housing 2 and end plate 3.

Tubular portions 13 and 14 are integral with gears 5 and 6 respectively and form central passages 23 and 24 which extend through the outer ends of bearings 7, 8, 9, and 10 respectively.

The left end of tubular portion 14 is splined to receive the splined right end of a drive shaft 36, whose outer end is provided with splined muff 37, that is adapted to be driven by the engine (not shown) on which the pump is mounted.

The left end of passage 24 opens into a chamber 38, which is hermetically sealed by a collar 39, and incloses a flange 40 which extends radially from shaft 36 and coacts with an annular, spring-pressed sealing ring 41, to form a fluid-tight joint therebetween. A passage 42 connects chamber 38 with a fuel inlet 43, through which fuel enters pump 1 at boost pressure from a fuel tank (not shown). By virtue of the foregoing arrangements, fuel at inlet pressure fills chamber 38, passages 23 and 24, and all of the spaces between the walls of housing 2 and the ends of tubular portions 13, 14 and bearings 7, 8; and 9, 10; as shown in FIGURE 1.

Fuel is discharged from pump 1 by an outlet passage 44 (see FIG. 2) which communicates with the spaces in bores 27 and 28 between the walls of housing 2, gears 5 and 6, and bearings 7, 8, 9 and 10, through a plurality of interstices in flanges 15, 16, 19 and 20; and in flanges 17, and 18, as more particularly described hereinbelow.

The flanges of both pressure-loaded and fixed bearings which abut side faces of the gears of a gear pump (such as flanges 15, 16, 17 and 18 in FIG. 1) have heretofore been constructed with full circular areas, mating with the side faces of the opposing gears; and relief grooves and recesses have been provided in the mating faces of these flanges, to reduce the axial thrust of the pumped fluid (between the flange and the mating side face of the gear), which tends to move the bearing from sealing contact with the side faces of the gears, and thus reduce the efficiency of the pump. The size and location of these relief grooves and recesses determined the magnitude of the axial thrust on the bearing, and were arrived at by tedious and expensive, empirical, cut-and-dry methods, which were aimed at producing an axial thrust that maintained a fluid-tight seal between the bearing flange and side face of its mating gear, with minimum frictional contact of these parts, and minimum loss of volumetric efficiency of the pump from leakage of fluid between the side surface of the gear and its adjacent bearing bushing.

I have discovered that full circular area flanges on the bushing bearings of a gear pump are not necessary for satisfactory functioning of the pump; and improved performance can be obtained by selectively removing one or more portions of these flanges, so that the pumped fluid freely enters all the spaces between the flange and the opposite wall of the housing. This, not only reduces the axial thrust of the pumped fluid on the bushing bearings, and thus affords a simple means of properly pressure-loading the bearing bushing, but also results in a marked reduction of (a) the weight of the pump; (b) the power required to drive the pump; (c) the frictional wear of the abutting elements (i.e. gears and bushing bearings); (d) the amount of debris caused by said friction; and (e) the pulsations in the pumped fluid caused by the intermittent action of the gear teeth. These reductions markedly improve the life, performance and efficiency of the pump.

My novel method of removing selected portions of the flanges of bushing bearings of a gear pump is illustrated in FIGS. 3, 4, 5, and 6; of which FIGS. 3 and 4 show front, side and end elevational views of the bearings of the pumping gears of FIG. 1; and FIGS. 5 and 6 show side and right end elevational views of the bearings of said gears. I have discovered that the performance, efficiency and useful life of the pump are largely dependent upon the precise sizes and locations of the portions of the bearings flanges that are removed, and the gist of my invention resides in the selection of these portions.

FIG. 3–A depicts (in elevation) the right end of bearing 7 (of FIG. 1), whose original outer circumference (before removal of selected portions of its flange 15) is indicated by a dash line, and the selected portions of the flange 15 which I remove entirely by completely cutting away the metal are denoted by reference letters $b$, $c$ and $d$. In portions $b$, $c$ and $d$ the metal is removed over the full thickness of the flange 15, so that these areas ($b$, $c$ and $d$) constitute the cross-sections of passages through which fluid at discharge pressure flows into an annular groove 49 (between flanges 15 and 19), and also into the annular space 45 between flange 19 and the opposite wall of housing 2 (in FIG. 1). In the portions $a$, $f$, and $g$ the metal removed is only a fraction of the full thickness of the flange 15, so that the area $a$ forms one side of a pocket in the flange 15 whose opposite side is the corresponding portion of the side face of gear 5, as indicated in FIGS. 3–A and 3–B. The portions of the flange 15 which remain unchanged are denoted by the reference letters $e$ and $h$, and serve to seal off the fluid, at pump inlet pressure (in recess $a$), from the fluid at pump discharge pressure which flows through passages, $b$, $c$ and $d$. The unremoved metal in portions $f$ and $g$ constitute legs of a spider which (with portions $e$ and $h$) serve to hold the bearing 7 in its proper aligned position in the pump chamber 27.

In FIGS. 3–B and 3–C, depicting (in side and end elevation) the bushing bearing 7, it will be seen that the flange 19 (FIG. 1) is provided with a plurality of cut-away portions $m$ which form passages for the flow of fluid (under discharge pressure) through flange 19 into annular chamber 45. The unremoved portions $n$ of flange 19 serve to hold the left end of bushing-bearing 7 in its proper aligned position in chamber 27. In the left face of each portion $n$ of flange 19 is a cylindrical recess 50 for the seating of spring 51 which biases bearing 7 towards the side face of gear 5, so as to insure sealing contact therebetween, when the pump is first started up and its discharge pressure is too low to secure a proper seal.

FIG. 4–A depicts (in elevation) the right end of bearing 9 (FIG. 1), whose original outer circumference (before modification according to my invention) is indicated by a dash line, and selected portions of the flange 17 which I remove are denoted by the reference letters $b'$, $c'$ and $d'$. In portions $b'$, $c'$ and $d'$ the metal is removed over the full thickness of flange 17, so that these areas ($b'$, $c'$ and $d'$) constitute cross-sections of passages through which fluid at discharge pressure flows into an annular groove 52 between flanges 17 and 20; and also into the annular space 46 (between flange 20) and the opposite wall of housing 2 (see FIG. 1). In the flange portions $a'$, $f'$ and $g'$, the metal is removed for only a fraction of the full thickness of the flange 17, so that the area $a'$ forms one side a pocket in the flange 17 whose opposite side is the corresponding portion of the side face of gear 6, as indicated in FIGS. 4–A and 4–B. The portions of the flange 17 which remain unchanged are denoted by reference letters $e'$ and $h'$, and serve to seal off the fluid at pump inlet pressure (in recess $a'$), from the fluid at pump discharge pressure, which flows through passages $b'$, $c'$ and $d'$. The unremoved metal in portions $f'$ and $g'$ constitute legs of a spider which (with portions $e'$ and $h'$) serve to hold the bushing 9 in its proper aligned position in pump chamber 28.

In FIGS. 4–B and 4–C, depicting (in side and end elevation) the bushing bearing 9, it will be seen that the flange 20 (FIG. 1) is provided with a plurality of cutaway portions $m'$ which form passages for the flow of fluid (under discharge pressure) through flange 20 into annular chamber 46. The unremoved portions $n'$ of flange 20 serve to hold the left end of bushing bearing 9 in proper aligned position in chamber 28. In the left face of each portion $n'$ of flange 20 is a cylindrical recess 53 for the seating of a spring 51 which biases bearing 9 towards the side face of gear 6, so as to insure sealing contact therebetween, when the pump is first started up and the discharge pressure is too low to secure a proper seal.

The removal of selected portions of flanges 16 and 18 (FIG. 1) of bushing bearings 8 and 10 is illustrated in FIGS. 5 and 6.

FIG. 5–A depicts (in elevation), the left end of bearing 8 (FIG. 1) whose original outer circumference (before removal of selected portions of its flange 16) is indicated by the outer circular line, and the selected portions of the flange 16 which I remove by cutting away the metal are denoted by reference letters $b_1$, $c_1$ and $d_1$. In portion $b_1$, $c_1$ and $d_1$ the metal removed is over the full thickness of the flange 16, so that these areas ($b_1$, $c_1$ and $d_1$) constitute the cross-sections of passages through which fluid at discharge pressure flows into an annular groove 55 (between flanges 16 and 21). In the portions $a_1$, $f_1$ and $g_1$ the metal removed is only a fraction of the full thickness of the flange 16, so that the area $a_1$ forms one side of a pocket in the flange 16 whose opposite side is the corresponding portion of the side face of gear 5, as indicated in FIGS. 5–A and 5–B. The portions of the flange 16 which remain unchanged are denoted by the reference letters $e_1$ and $h_1$, and serve to seal off the fluid, at pump inlet pressure (in recess $a_1$), from the fluid at pump discharge pressure which flows through passages, $b_1$, $c_1$ and $d_1$. The unremoved metal in portions $f_1$ and $g_1$ constitute legs of a spider which (with portions $e_1$ and $h_1$) serve to hold the bearing 8 in its proper aligned position in the pump chamber 27.

In FIG. 5–B, depicting (in side elevation) the bushing bearing 8, it will be seen that the flange 21 (FIG. 1) has a full circular configuration which serves to hold the right end of bushing-bearing 8 in its proper aligned position in chamber 27. It will also be noted (FIG. 1) that the full area of flange 21 abuts an adjacent portion of plate 3, which serves to hold bearing 8 and gear 6 in proper axial sealing position, in opposition to the bias of springs 51.

FIG. 6–A depicts (in elevation) the left end of bearing 10 (FIG. 1), whose original outer circumference (before modification according to my invention) is indicated by a full circular line, and selected portions of the flange 18 which I remove are denoted by the reference letters $b_2$, $c_2$ and $d_2$. In portions $b_2$, $c_2$ and $d_2$ the metal is removed over the full thickness of flange 18, so that these areas ($b_2$, $c_2$ and $d_2$) constitute cross-sections of passages through which fluid at discharge pressure flows into an annular groove 56 between flanges 18 and 22. In the flange portions $a_2$, $f_2$ and $g_2$ the metal is removed for only a fraction of the full thickness of the flange 18, so that the area $a_2$ forms on one side a pocket in the flange 18, whose opposite side is the corresponding portion of the side face of gear 6, as indicated in FIGS. 6–A and 6–B. The portions of the flange 18 which remain unchanged are denoted by reference letters $e_2$ and $h_2$, and serve to seal off the fluid at pump inlet pressure (in recess $a_2$), from the fluid at pump discharge pressure, which flows through passages $b_2$, $c_2$ and $d_2$. The unremoved metal in portions $f_2$ and $g_2$ constitute legs of a spider which (with portions $e_2$ and $h_2$) serve to hold the bushing 10 in its proper aligned position in pump chamber 28.

In FIG. 6–B, depicting (in side elevation) the bushing bearing 10, it will be seen that the flange 22 (FIG. 1) is of full circular configuration and the full area of this flange abuts the adjacent part of plate 3, which serves to hold bearing 10 and gear 6 in proper axial position, in opposition to the bias of springs 51.

Prior to my invention, the problem of how best to balance the axial thrust of the pumped fluid on pressure-loaded bushing bearings of a gear pump was one of long standing in the art, which had eluded the best efforts of inventors to solve, as is attested by the plethora of patents proposing a wide variety of solutions, which generally comprised the provision of grooves and recesses in the sealing faces of the bearing bushings. None of these proposed solutions proved capable of attaining the desired pressure balancing of the bearing bushings, largely owing to the impossibility of accurately determining the fluid pressure gradients across the sealing faces of the bearings. While it was known that these gradients varied from full discharge pressure at the outer circumference of the sealing surface (which was connected to the pump outlet) to some lower pressure adjacent the journal of the gears (which was connected to a region of lower fluid pressure), the variation of fluid pressure in these gradients was not a linear function of the radial distance between the periphery of the sealing surface and the journal of the gears, but was a complex non-linear function not susceptable of accurate determination.

So long as it was assumed that the full circular area of the bearing bushing was required to satisfactorily seal the mating surfaces of the bearing and the adjacent side face of the gear, little or no progress was made in attaining a satisfactory solution of the sealing problem.

My discovery, that the full circular area of the bearing bushing was not necessary to obtain a satisfactory seal, was arrived at as a result of much research, experimentation and ingenuity, which proved that this sealing area could be substantially reduced (e.g. by about one-third of the full circular area), without impairing the full efficiency of the pump; and further that such reduction actually improves the performance, efficiency and useful life of the pump, by reducing the kinetic friction between the sealing surfaces of the bushing bearing and the side of the gear.

This reduction in friction resulted in:

(1) a substantial (e.g. about one-third) lightening of the bearing from its former weight,
(2) a reduction in the heat generated by the rubbing action of the sides of the gear on the contacting bearing bushings,
(3) reduction in the amount of metal debris due to the milling action of the gear teeth on the bushing bearings,
(4) reduction of the pulses generated in the pumped fluid by the interrupted action of the gear teeth,
(5) reduction of the erosion of the bearing bushings, due to better lubrication and heat ablation by the pumped fluid on the sealing surface,
(6) reduction in the power required to drive the pump.

However, I found that these beneficial effects could only be obtained, without reducing the volumetric efficiency of the pump, by definite determination of the sizes and locations of the portions of the bearing flanges that were removed. If the bearing flange is cut away at some point O, generally one to two gear teeth of arc from the edge of the pump inlet 43 (see FIG. 2), the gear interstices, as well as the pressure loading chamber, are filled by the pumped fluid when it reaches pump discharge pressure and remains at this pressure until discharged from the pump. The high pressure fluid is prevented from re-entering the inlet portion of the pump (area a) by the mesh of the gear teeth, by the contact of flat surfaces of the mating bearings (see FIG. 2), and the sides of the gear teeth on the remaining portion of the flanges which fit tightly against the walls of the housing 2.

OPERATION

The fluid (fuel) to be pumped enters the pumping chamber (bores 27 and 28) of the pump 1 through the inlet 43 (see FIG. 2), and from there flows into the chamber formed by the teeth of the gears 5 and 6, the walls of housing 2 and the bearing flanges 15, 16, 17 and 18. The teeth of gears 5 and 6 (which are rotating) move the fluid, in the direction indicated by the arrows in FIG. 2, along the walls of housing 2. At a point O (FIG. 2), the fluid assumes discharge pressure and enters the interstices between the gears, the bushing bearings 7, 8, 9 and 10, and the walls of the housing 2, which constitute the pressure loading and fluid resonance chamber. The fluid remains at discharge pressure until it leaves the pump outlet 44.

The high pressure fluid is prevented from re-entering the low pressure portion of the pump by the intermeshing teeth of gears 5 and 6 which also bear against the walls of the housing 2, and the unremoved portions e of bearing flanges 15, 16, 17 and 18, which bear with a fluid tightly running fit against the walls of housing 2 and the side faces of the gears 5 and 6.

The reduction of the flange areas in contact with sides of the gears reduces the rubbing friction therebetween, which in turn reduces the heat, erosion, and debris generated by wear and milling action of the gears on the bushing bearings. By virtue of the fact that the pumped fluid is delivered to the high pressure area of the pump intermittently (because the interstices are separated by teeth), pulses in the fluid are generated. Since the flanges of my invention do not confine this pulse wave generation to the tooth spaces, the wave fronts can travel in many directions, and their energy can be dissipated by the shear of the liquid and the interference with reflected waves from the pressure loading chamber.

The proper hydraulic balancing of the thrust of the pumped fluid on the sides of the gears 5 and 6 is adjusted so as to give a slight net thrust of the bearing bushings 7, 8, 9 and 10 toward the mating side faces of the gears 5 and 6, just sufficient to maintain the integrity of the seal between the bushings and gears, throughout the entire speed range of the pump. This balancing is more readily and certainly accomplished by the construction of the bearing bushings in accordance with my invention because of the simplification of the pressure gradients existing between the bearing bushings and the side faces of gears (i.e. across areas e of FIGS. 2 and 3–6), and the reduction of the magnitude of discharge pressure pulsations.

While I have disclosed the preferred embodiment of my invention, I desire it to be understood that I do not confine it to the precise details of construction hereinabove described and illustrated in the drawings, since these may be changed and modified by those skilled in the art without departing from the spirit of my invention or exceeding the scope of the approved claims.

I claim:

1. A gear type liquid pump, comprising: a housing containing a pair of adjoining substantially cylindrical chambers having radial end walls; a toothed gear member in each of said cylindrical chambers, said gear members meshing at the juncture of said cylindrical chambers and having oppositely extending supporting journals, said housing having an inlet and an outlet, a bushing member in each of said cylindrical chambers associated with said gear members on at least one side of said gear members, said bushing members each having a flange, each flange having selected portions thereof cutaway to provide a flange segment having an acute angular displacement extending from said outlet to said inlet with a front face cooperable with the adjacent side face of its associated gear member to form a seal therewith and a plurality of passageways extending the full axial length of said bushing, said cutaway portions forming at least one lug member extending radially from the main portion of said bushing, said lug circumferentially positioned adjacent said zone of juncture and axially displaced from the adjacent side face of said gear member to provide a passageway therebetween through which discharge pressure circumferentially flows into said cutaway portion to apply fluid at discharge pressure to the back face of said flange segment to bias the bushing toward the side face of its adjacent gear member.

2. A gear type liquid pump comprising; a housing having a pump chamber and an inlet leading into and an outlet leading from said chamber; means including a rotatable gear member mounted in said pump chamber for forcing liquid from said inlet out of said housing through said outlet; a bearing bushing, comprising a sleeve and a flange in said pump chamber, said flange having a back face spaced from the adjacent end wall of said pump chamber forming a high-pressure chamber wherein liquid under pump discharge pressure biases said bushing toward said gear member; said flange also having a front face subject, at its outer periphery, to the pressure in said high pressure chamber, and at its inner periphery, to pump inlet pressure, said front face cooperable with the adjacent side of said gear member to provide therewith a pumping seal area during pumping; means defining passage communication between said inlet passage and the radial inner peripherial portions of said seal area; portion of the periphery and front face of said flange cutaway to provide means establishing communication between said high pressure chamber and said pump outlet; the relation of the area of said back face to said sealing area being such that the force acting upon said back face of said flange always exceeds the force acting upon said front face of said bushing, whereby to maintain said pumping seal with minimum friction, wear, and loss of pump volumetric efficiency.

3. A gear type liquid pump, comprising; a housing containing a pair of adjoining substantially cylindrical chambers having radial end walls, a toothed gear member in each of said cylindrical chambers, said gear members meshing at the juncture of said cylindrical chambers and having oppositely extending supporting journals, said housing having an inlet and an outlet, a bushing member in each of said cylindrical chambers associated with said gear members on at least one side of said gear members, said bushing members each having a main portion and a flange segment adjacent one end of said main portion extending in the direction of rotation of said gears from adjacent said outlet to beyond said inlet and provided with a front face cooperable with the adjacent side face of its associated gear member to form a seal therewith, said flange segment of said bushing member including a generally circular portion complementary to the cylindrical chamber associated therewith and said flange segment also having complementary meeting surfaces disposed in the zone of juncture of said cylindrical chambers, the main portion of said bushing spaced from its associated cylindrical chamber to form a reservoir extending circumferentially around and the entire length of said bushing, at least one lug substantially in the plane of said flange segment extending from the main portion of the bushing to said associated cylindrical chamber to assist said flange segment in locating said bushing in said chamber, said lug spaced from the side face of said gear to provide a passageway by which the pumped liquid at discharge pressure is applied to said reservoir and the back face of each of said flange segments to bias its bushing toward the side face of its adjacent gear member.

4. A pump according to claim 3, wherein the length of the flange segment in sealing engagement with the side face of its associated gear extends circumferentially for a distance approximately two and one-half gear teeth.

5. A pump according to claim 3, wherein each of said bearing bushing is provided with a second angular outward extending flange with outer periphery as cutaway portions forming passageways therethrough by which liquid, at pump discharge pressure, flows from said reservoir into an annular chamber, said second flange between its cutaway portions also defining a plurality of circumferentially faced lugs which contact the walls of its associated cylindrical chamber and serves to hold the bearing bushing in axial alignment with said cylindrical chamber.

6. A pump according to claim 3, wherein the front sealing face of the flange segment is recessed adjacent the inlet to provide a passageway for the fluid from the inlet to the gear teeth.

References Cited by the Examiner

UNITED STATES PATENTS

| | | | |
|---|---|---|---|
| 2,714,856 | 8/1955 | Kane | 103—126 |
| 2,891,483 | 6/1959 | Murray et al. | 103—126 |
| 3,008,426 | 11/1961 | Edwards et al. | 103—126 |
| 3,083,645 | 4/1963 | Donner et al. | 103—126 |

MARK NEWMAN, *Primary Examiner.*

WILBUR J. GOODLIN, *Examiner.*